(12) United States Patent
Mock et al.

(10) Patent No.: US 6,994,367 B2
(45) Date of Patent: Feb. 7, 2006

(54) METAL AND REINFORCED PLASTIC COMPOSITE BICYCLE FRAME

(75) Inventors: Aaron Mock, Lake Mills, WI (US); Michael L. Zeigle, Sun Prairie, WI (US); David Hayes, Waterloo, WI (US); Chad Lockart, Madison, WI (US)

(73) Assignee: Trek Bicycle Corporation, Waterloo, WI (US)

(*) Notice: Subject to any disclaimer, the term of this patent is extended or adjusted under 35 U.S.C. 154(b) by 13 days.

(21) Appl. No.: 10/831,483

(22) Filed: Apr. 23, 2004

(65) Prior Publication Data
US 2005/0006872 A1 Jan. 13, 2005

Related U.S. Application Data

(60) Provisional application No. 60/485,676, filed on Jul. 9, 2003.

(51) Int. Cl.
B62K 19/02 (2006.01)

(52) U.S. Cl. ............. 280/288.1; 280/274; 280/288.3

(58) Field of Classification Search ............ 180/281.1, 180/274, 288.3
See application file for complete search history.

(56) References Cited

U.S. PATENT DOCUMENTS

| | | | |
|---|---|---|---|
| 3,966,230 A | 6/1976 | Nicol | |
| 4,493,749 A | 1/1985 | Brezina | |
| 4,541,649 A | 9/1985 | Grunfeld | |
| 4,856,800 A | 8/1989 | Hashimoto et al. | |
| 4,900,050 A | 2/1990 | Bishop et al. | |
| 4,902,160 A * | 2/1990 | Jeng | 403/205 |
| 5,116,071 A * | 5/1992 | Calfee | 280/281.1 |
| 5,122,210 A | 6/1992 | Kubomura et al. | |
| 5,271,784 A | 12/1993 | Chen et al. | |
| 5,346,237 A | 9/1994 | Wang | |
| 5,364,115 A * | 11/1994 | Klein et al. | 280/288 |
| RE35,335 E | 9/1996 | Calfee | |
| 5,613,794 A | 3/1997 | Isaac et al. | |
| 5,842,711 A | 12/1998 | Legerot | |
| 5,857,690 A | 1/1999 | Gueugneaud | |
| 5,876,054 A | 3/1999 | Olson et al. | |
| 6,267,399 B1 | 7/2001 | Buckmiller et al. | |
| 6,270,104 B1 | 8/2001 | Nelson et al. | |
| 6,340,509 B1 | 1/2002 | Nelson et al. | |

FOREIGN PATENT DOCUMENTS

| | | |
|---|---|---|
| EP | 0491363 A1 | 6/1992 |
| EP | 587927 A1 * | 3/1994 |
| FR | 2528002 | 12/1983 |
| FR | 2702730 | 6/1995 |
| WO | WO 8908039 A * | 9/1989 |

* cited by examiner

Primary Examiner—Kevin Hurley
(74) Attorney, Agent, or Firm—James B. Conte; Barnes & Thornburg LLP

(57) ABSTRACT

A metal and fiber reinforced plastic composite combines a welded metal tube spine with a reinforced plastic composite seat assembly, top tube and seat stays.

20 Claims, 3 Drawing Sheets

METAL AND REINFORCED PLASTIC COMPOSITE BICYCLE FRAME

Priority is claimed based on Provisional Application Ser. No. 60/485,676 filed Jul. 9, 2003 and having the same title and inventors.

BACKGROUND OF THE INVENTION

1. Field of the Invention

The invention is a composite bicycle frame combining a metal spine with a fiber reinforced plastic composite seat tube, top tube, seat lug and seat stay assembly.

2. Description of Related Art

Bicycle frames formed as composites, namely comprising different materials, have been long known. These date back to historical times using wood with metal joints or reinforcements. In modern times, steel frames using investment cast lugs or joints and drawn or extruded tubes are well-known. More recently, a combination of metal lugs and fiber reinforced plastic composite tubes, particularly carbon fiber reinforcing an epoxy matrix, have been known. An example is U.S. Pat. No. 4,900,049 issued to Tseng which illustrates investment cast aluminum lugs, taught they are primarily for use with aluminum tubes, but which could also use carbon fiber tubes. Other carbon fiber frames include U.S. Pat. No. 4,047,731 issued to Van Auken and U.S. Pat. No. 4,493,749 issued to Brezina.

More recently, bicycles in which the main triangle is formed of a high strength, light weight metal, such as titanium and the rear triangle, more specifically the seat stay assembly and chain stays, have been made of carbon fiber tubes. Typically, the rear dropouts have been metal in all cases because of reater durability when subject to the clamping of the wheels to the frame. It is also believed that a company called Merlin has used carbon top tube, seat tube, and monostay but have joined all together with a welded titanium seat cluster.

SUMMARY OF INVENTION

The composite bicycle frame of the invention combines a metal spine with a fiber reinforced plastic composite seat tube, top tube, seat lug and seat stay assembly. A continuing goal for bicycles is to combine a strong frame with light weight and a good quality ride. This is a particular demand for athletes who compete at high levels because seemingly slight performance differences can result in the difference between a win and a second place finish. An example was a Tour de France in which Mr. Greg LeMond, under whose trademark license bicycles according to this invention have been manufactured, won a month long race by an elapsed time difference of seconds.

At this elite and demanding athletic level, other factors come into play. A level of shock absorbance by the frame is an advantage. Power transmission from the rider, pedaling with legs reciprocating and pedals rotating is also important. Thus, the bicycle frame of the invention uses light weight and strong materials, selected metal tubing and joints, preferably titanium, steel, or aluminum, and selected carbon fiber reinforced plastic tubing and joints in a novel manner. The preferred titanium spine provides light weight and strength with improved stiffness for power transmission under the complex motion transmitting leg movement to wheel rotation as there is a greater side to side load at the lower portion of the frame. The carbon fiber reinforced plastics provide light weight and strength with requisite stiffness and shock absorption for steering and power transmission under the loads imposed in the top region of the bicycle frame.

DESCRIPTION OF PREFERRED EMBODIMENTS

Figure 1:
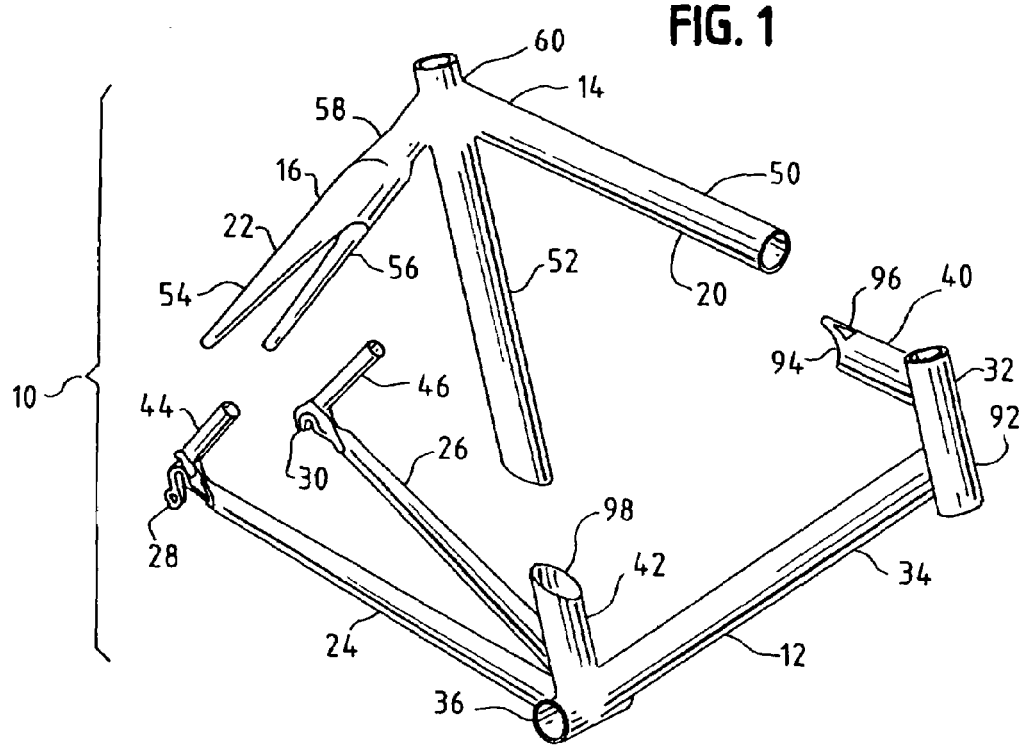
FIG. 1 is an exploded perspective view of the bicycle frame showing the metal spine and the reinforced plastic portion.
Figure 2:
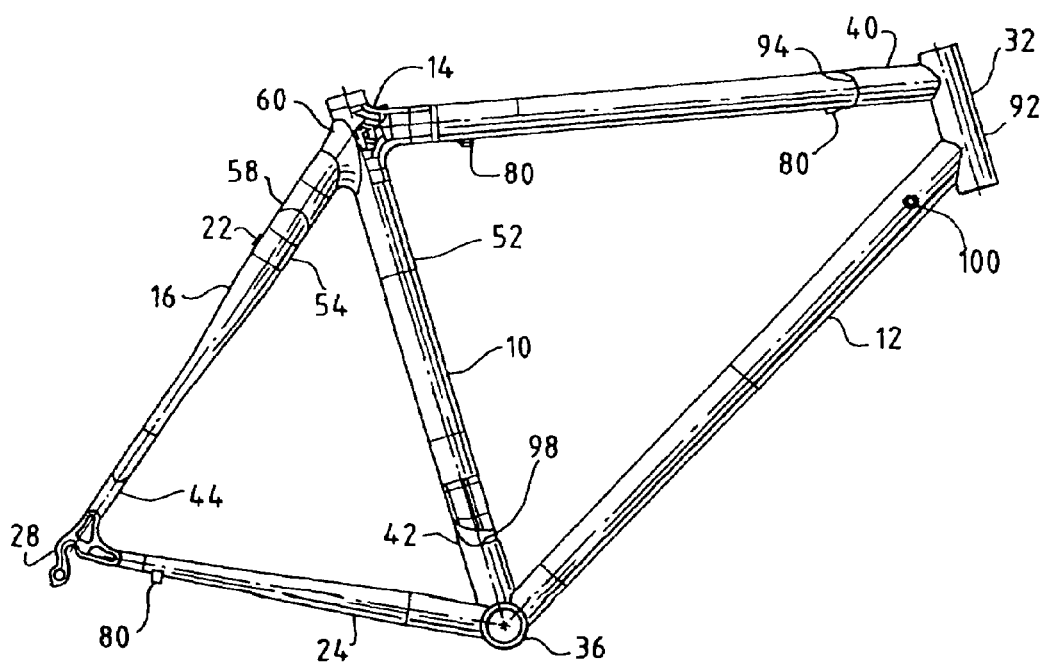
FIG. 2 is a right side elevational view.

A bicycle frame 10 is formed with a metal spine 12 and an upper assembly 14 formed of carbon fiber reinforced epoxy plastic. These combine to respectively form portions of the rear triangle 16 and main triangle 20 together forming a bicycle diamond frame.

The seat stay assembly 22 is of carbon fiber tubes while the chain stays 24, 26 are part of the spine 12. The rear dropouts 28, 30 are metal in part for greater durability when subject to the clamping of the wheels to the frame 10. The invention takes a unique approach of forming the spine 12 of titanium with the upper portion comprising the seat tube assembly 14 of carbon fiber reinforced plastic. It has been discovered that for high performance bicycle riders, the flexing of the spine in a light weight high performance carbon fiber frame can be considered undesirable while the lighter weight and flexibility permitted by carbon fiber can be used advantageously in the top portion 14. Accordingly, spine 12 comprises a head portion 32, a main tube 34, a bottom bracket portion 36 in addition to the chain stays 24, 26.

Head portion 32 has a rearwardly projecting cylindrical receptacle 40. Bottom bracket portion 36 has an upwardly projecting cylindrical receptacle 42 and upwardly and forwardly projecting cylindrical receptacles 44, 46 extend upwardly from dropouts 28, 30.

Each of these respective cylindrical receptacle 40, 42, 44, 46 matingly receives carbon fiber tubes. The proportions taught in the drawings provide interior surface area in receptacles 40, 42, 44, 46 sufficient to form a strong metal to plastic adhesive bond. As is apparent from inspection of the drawings, therefore, both the bottom bracket receptacle 42 and head tube receptacle 40 have a length of between about two and three times the width, while the seatstay receptacles 44, 46 have a length of between about two and one half and five times the width.

The carbon fiber portion 14 comprises top tube 50, seat tube 52, seat stay assembly 22 including seat stays 54, 56 and yoke portion 58 all joined at seat lug portion 60.

Figure 3:
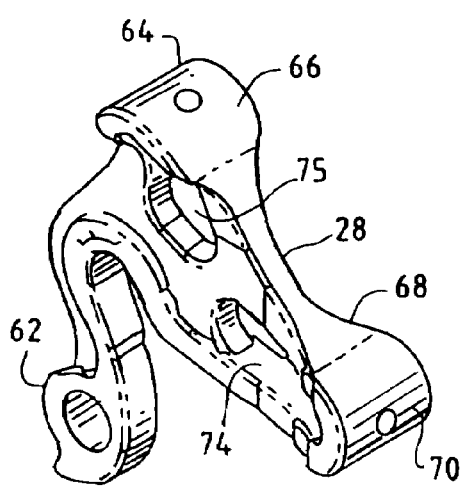
FIG. 3 is a perspective view of the right rear dropout before welding.
Figure 4:
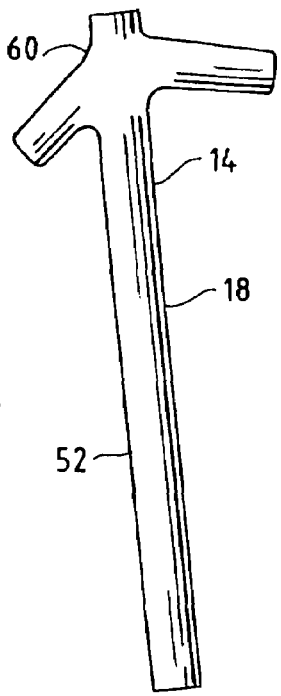
FIG. 4 is a right side elevation showing the seat tube assembly.
Figure 5:
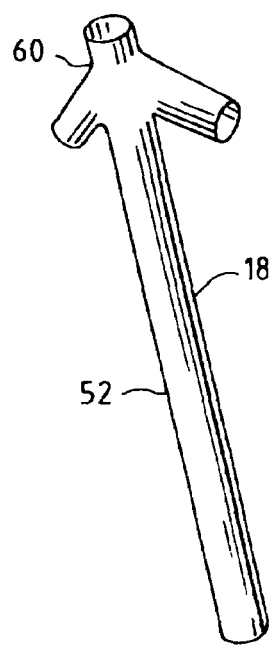
FIG. 5 is a right front perspective view showing the seat tube.
Figure 6:
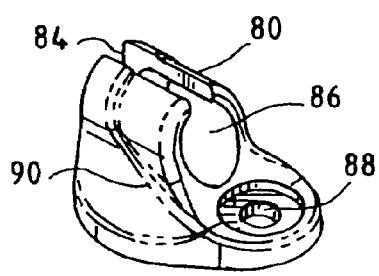
FIG. 6 is a perspective view of a cable stop of the bicycle frame of the invention.
Figure 7:
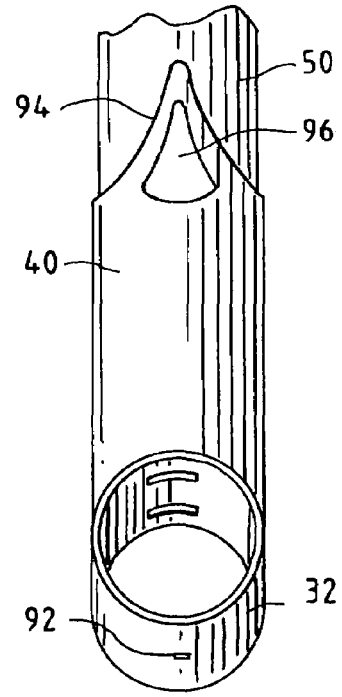
FIG. 7 is a top plan view of the head tube and lug of the invention.
Figure 8:
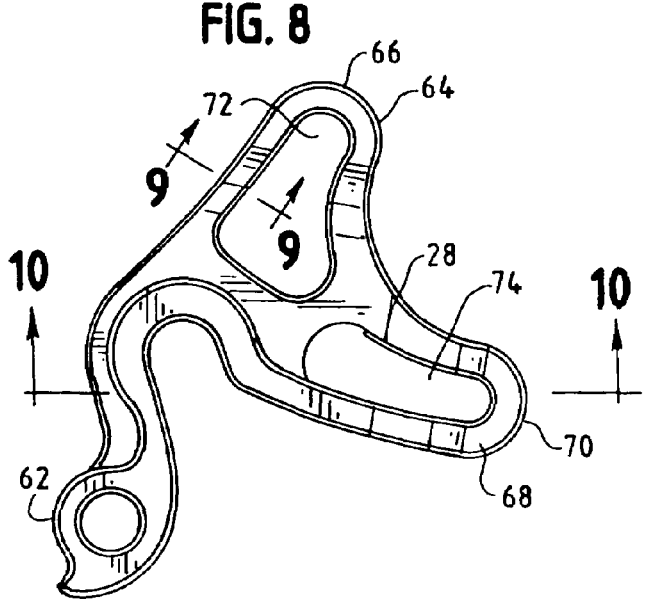
FIG. 8 is a right side elevational view of the dropout of the invention.
Figure 9:
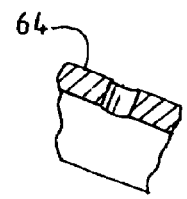
FIG. 9 is a sectional view of the projecting portion of the dropout that receives the seatstay lug at line 9—9 of FIG. 8.
Figure 10:
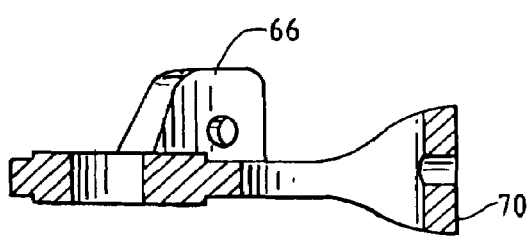
FIG. 10 is a sectional view of the dropout at line 10—10 of FIG. 8.
Figure 11:
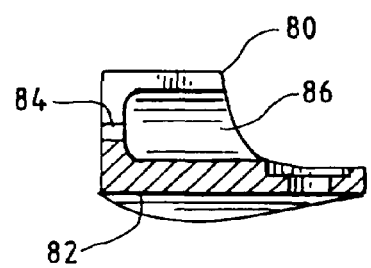
FIG. 11 is a sectional view of the cable stop at line 11—11 of FIG. 13.
Figure 12:
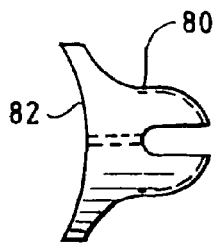
FIG. 12 is an end elevational view of the cable stop.
Figure 13:
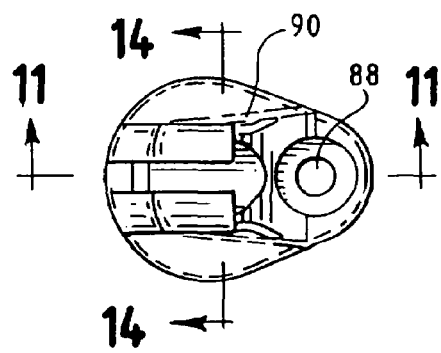
FIG. 13 is a top plan view is a sectional view of the cable stop.
Figure 14:
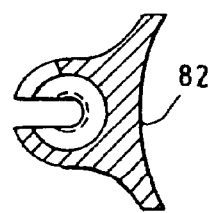
FIG. 14 is a sectional view of the cable stop at line 14—14 of FIG. 13.

Dropouts 28, 30 are formed in substantially the same way, with the exception that dropout 28 has derailleur hanger 62 integrally formed therewith. The structure used to form spine 12 will be described with reference to dropout 28 in FIGS. 3, 8, 9 and 10. Dropout 30 is formed with similar structures as noted above. Projection 64 ends in land 66 which receives cylindrical receptacle 44. Receptacle 44 is a tapered tube the end of which is carefully formed to mate with land 66 to which the tube can be welded. Similarly, forward projection 68 ends in land 70 which receives the shaped end of chainstay 24.

Welding of the component members that make up spine 12 is accomplished using known tubing welding or other tubing joining techniques. Upwardly extending projection 64 is formed with aperture 72 for better strength, weight and weldability. Forwardly extending projection 68 is formed with aperture 74 for similar considerations.

Cable guides 80 have a curved surface 82 which fits flush with tube 50 or can be sized to fit chainstay 24. Slot 84 receives a brake or derailleur cable and socket 86 receives the cable sheath. Mounting aperture 88 enables the use of fasteners, such as bolts, screws, rivets or pins to provide mechanical strength fastening guide 80 to frame 10. Surface 82 is preferably adhesively bonded to the composite tubes, and can be welded to the metal tubes. Ridge 90 provides both an aesthetically pleasing accent and the wall thickness between the portion having slot 84 and socket 86 can be maintained fairly constant for better performance.

Head portion 32 is formed with head tube 92 and rearwardly projecting cylinder 40. Cylinder 40 terminates in a mitered edge 94 which is formed with a window 96. Edge 94 and window 96 have both aesthetic and functional attributes providing both a pleasing form and aligning stresses better while providing for a lighter structure. Edge 98 of cylinder 42 can be similarly formed and have similar aesthetic and functional attributes.

Fitting 100 can be a mount for a cable guide specially arranged for leading a derailleur cable from a handlebar or brake lever mounted shift mechanism, or for a tube mounted derailleur lever.

In an alternative embodiment, the metallic spine 12 can be formed of other metals. A high strength, high modulus steel has been found to be an effective alternative, having light weight, high stiffness in the spine and greater economy than titanium. With appropriate tubing alloys and geometry, other metals such as aluminum can be suitable. These will provide similar advantages in strength and stiffness, but have the benefits of greater economy and ease of manufacture, repair and machinability. Other combinations of a stiffer lower portion and lighter, more resilient upper portion, such as ceramics or other exotic fiber reinforced materials are also possible.

We claim:

1. A composite bicycle frame of a first metal subassembly and a second fiber reinforced plastic composite subassembly comprising:

the first metal subassembly being a metal spine having a head portion, a main tube, a bottom bracket portion and chain stays, said chain stays terminating in dropouts;

said head portion has a rearwardly projecting cylinder; said bottom bracket portion has an upwardly projecting cylindrical receptacle;

said dropouts have upwardly and forwardly projecting cylindrical receptacles extending therefrom;

said fiber reinforced plastic composite subassembly having a fiber reinforced plastic composite seat tube, top tube, and seat stay assembly;

said composite seat tube, top tube, and seat stay being joined at a seat lug portion; said seat lug portion being received in and bonded to said top tube;

said composite seat tube being received in and bonded to said bottom bracket receptacle;

said top tube being received in and bonded to said head tube receptacle, and said seat stay assembly being received in and bonded to said dropout receptacles;

said spine is formed of welded titanium or welded titanium alloy;

said composite seat tube spanning the greater portion of the distance between said top tube and said bottom bracket receptacle;

said bottom bracket receptacle having a width and a length in which said length is between two and three times the width;

said top tube spanning the greater portion of the distance between said seat tube and said head tube;

said head tube receptacle having a width and a length in which said length is between two and three times the width;

said seat stay assembly spanning the greater portion of the distance between said dropout and the intersection of said seat tube and top tube;

said dropout receptacle having a width and a length in which said length is between two and five times the width;

said seat tube and said seat lug portion being formed as a unitary structure of fiber reinforced plastic, said second fiber reinforced plastic composite subassembly is formed entirely of fiber reinforced plastic tubes with an integral seat lug portion.

2. A composite bicycle frame of a first metal subassembly and a second fiber reinforced plastic composite subassembly comprising:

the first metal subassembly being a metal spine having a head portion, a main tube, a bottom bracket portion and chain stays;

said head portion has a rearwardly projecting cylinder; said bottom bracket portion has an upwardly projecting cylindrical receptacle; dropouts formed to have upwardly and forwardly projecting cylindrical receptacles extending therefrom;

said fiber reinforced plastic composite subassembly having a fiber reinforced plastic composite seat tube, top tube, and seat stay assembly;

said composite seat tube, top tube, and seat stay being joined at a seat lug portion; said seat lug portion being received in and bonded to said top tube;

said composite seat tube being received in and bonded to said bottom bracket receptacle;

said top tube being received in and bonded to said head tube receptacle, and said seat stay assembly being received in and bonded to said dropout receptacles.

3. The frame of claim 2 further comprising:

said spine is formed of welded titanium or welded titanium alloy.

4. The frame of claim 2 further comprising:
said composite seat tube spanning the greater portion of the distance between said top tube and said bottom bracket receptacle;
said bottom bracket receptacle having a width and a length in which said length is between two and three times the width.

5. The frame of claim 2 further comprising:
said top tube spanning the greater portion of the distance between said seat tube and said head tube;
said head tube receptacle having a width and a length in which said length is between two and three times the width.

6. The frame of claim 2 further comprising:
said seat stay assembly spanning the greater portion of the distance between said dropout and the intersection of said seat tube and top tube;
said dropout receptacle having a width and a length in which said length is between two and five times the width.

7. The frame of claim 2 further comprising:
said seat tube and said seat lug portion being formed as a unitary structure of fiber reinforced plastic.

8. The frame of claim 2 further comprising:
said seat tube and said seat lug portion being formed in a unitary structure of fiber reinforced plastic.

9. The frame of claim 2 further comprising:
said seat tube and said seat lug portion being formed as separate bonded structures with at least said seat tube of fiber reinforced plastic.

10. The frame of claim 2 further comprising:
said spine is formed of titanium or titanium alloy;
said second fiber reinforced plastic composite subassembly is formed of fiber reinforced plastic tubes with an integral seat lug portion.

11. The frame of claim 2 further comprising:
said spine is formed of titanium or titanium alloy;
said second fiber reinforced plastic composite subassembly is formed of fiber reinforced plastic tubes bonded to a metal seat lug portion.

12. A metal and fiber reinforced composite bicycle frame comprising:
a metal spine having a head portion, a main tube, a bottom bracket portion and chain stays and dropouts;
said head portion has a rearwardly projecting cylinder;
said bottom bracket portion has an upwardly projecting cylindrical receptacle; a fiber reinforced plastic composite tubeset having a fiber reinforced plastic composite seat tube, top tube, and seat stay assembly;
said composite seat tube, top tube, and seat stay being joined at a seat lug portion; said spine being joined to said tubeset at said head portion and at said dropouts.

13. The frame of claim 12 further comprising:
said spine includes a head tube and a rearwardly projecting receptacle to matingly receive said top tube.

14. The frame of claim 12 further comprising:
said tubeset is formed and arranged so that said seat tube, top tube, and seat stay assembly are joined together with a separate seat lug.

15. The frame of claim 12 further comprising:
said tubeset is formed and arranged so that said seat tube, top tube, and seat stay assembly are joined together with a seat lug portion formed integrally with the seat tube.

16. The frame of claim 14 further comprising:
said seat lug is formed of a fiber reinforced plastic.

17. The frame of claim 12 further comprising:
said spine is formed and arranged with a plurality of receptacles extending coaxially with said seat tube, top tube, and seat stay assembly and said receptacles matingly receive and are bonded to said seat tube, top tube, and seat stay assembly.

18. The frame of claim 17 further comprising:
said spine is formed and arranged with a plurality of receptacles extending coaxially with said seat tube, top tube, and seat stay assembly and said receptacles matingly receive and are bonded to said seat tube, top tube, and seat stay assembly.

19. The frame of claim 18 further comprising:
said receptacles comprising a bottom bracket receptacle, a head tube receptacle and a pair of seat stay receptacles;
said bottom bracket receptacle having a width and a length in which said length is between two and three times the width;
said head tube receptacle having a width and a length in which said length is between two and three times the width;
said seatstay receptacles each having a width and a length in which said length is between two and one half and five times the width.

20. The bicycle frame of claim 12 further comprising:
said spine is also joined to said tubeset at said bottom bracket portion, whereby said seat tube extends downwardly to join an upwardly projecting cylindrical receptacle on said bottom bracket portion.

* * * * *